Patented Aug. 18, 1936

2,051,575

UNITED STATES PATENT OFFICE 2,051,575

PROCESS FOR THE MANUFACTURE OF POLY-MEMBERED CYCLIC AMINES

Leopold Ruzicka, Zurich, Switzerland, assignor to Society of Chemical Industry in Basle, Basel, Switzerland No Drawing. Application November 22, 1934, Serial No. 754,336. In Switzerland November 25, 1933

8 Claims. (Cl. 260—127)

Starting from aliphatic compounds poly-membered cyclic amines have hitherto only been accessible by ring-closure to a very limited extent. It follows from data of the literature that the 7- to 9-membered cyclic amines from the corresponding ω-alkyl-halide-amines are either not formed at all or at the most with extremely poor yield.

According to von Braun and Steindorf "Berichte der deutschen Chem. Ges., vol. 38 (1905), page 3083, and according to von Braun and Goll, loc. cit., vol. 60 (1927), page 1534, hexa-methylene-imine is said to form in small quantity from 6-chloro-1-aminohexane. But the melting points of the chloroplatinate and the iodine methylate of this hexamethylene-imine indicated by von Braun and Steindorf deviate so considerably from the values found for these derivatives by other quarters (Wallach, Annalen der Chemie, vol. 324 (1902), page 392, and Müller and Sauerwald, Monatshefte für Chemie, vol. 48 (1927), page 729) that at least the purity of the amine obtained by von Braun and Steindorf appears to be very questionable. It can be gathered from the "Berichte der deutschen Chem. Ges." vol. 39, (1906), page 4111, that there is no tendency for formation of the heptamethylene-imine from the corresponding alkyl-halide-amine. If, in contradistinction to this, von Braun and Deutsch, loc. cit., vol. 46, (1913), page 231, contend to have obtained octamethylene-imine in form of the chloroplatinate of melting point 197° C., this is very improbable for the reason that a nine-membered ring could hitherto not be obtained according to a process which failed when applied to the analogous eight-membered ring. The octamethylene-imine, by the way, could be produced according to another process by reduction of the cyclo-octanone-thioisoxime (Helvetica Chimica Acta, vol. 16 (1933), page 1323). The analytically pure chloroplatinate prepared therefrom showed the constant melting point of 187–188° C. Consequently, von Braun and Deutsch obtained either an impure octamethylene-imine only or no octamethylene-imine at all.

The present invention is based on the observation that it is easy to obtain poly-membered cyclic amines by heating compounds of the formula

X—A—NH₂ wherein X stands for halogen and A for an alkylene chain containing at least six members in a homogeneous solution.

It is essential for the success of the invention that the process be carried out in dilute and homogeneous solution, since it has been found that the failure of the previous experiments was due to the use of too concentrated a reaction mixture. The alkyl-halide-amines used remained mainly undissolved which favored by-reactions with formation of higher molecular reaction products.

Solvents suitable for the process are for example ether, benzene, petroleum ether, water, aqueous alcohols, aqueous solutions of hydrotropic organic compounds, such as, for instance, alkali-benzoate, urethane, alkyl urea, aliphatic fatty acid amides, and the like.

The following examples illustrate the invention:—

Example 1

The hydrochloride of 1-bromo-15-amino-pentadecane is caused to react in an ethereal suspension with 1 mol. of dilute aqueous solution of caustic soda, while cooling and stirring. The ethereal solution of the free amine thus obtained is dried and diluted with abundant ether. It is then boiled in a reflux apparatus until the conversion into the hydrobromide of the cyclo-pentadecamethylene-imine is complete. This can be recognized by the fact that a further increase of the precipitate formed does not take place. The cyclo-pentadecamethylene-imine freed from the precipitated salt by addition of an excess of aqueous caustic soda solution boils at about 120° C. at 0.1 mm. pressure, and after recrystallization from aqueous acetone melts at 48–49° C. The product is identical with the base obtained by reduction of the cyclo-pentadecanone-thioisoxime.

Example 2

The hydrochloride of 1-bromo-8-amino-octane is treated according to the process described in Example 1 with the difference that benzene is used instead of ether, and that the benzene solution of the bromoamine is heated to 40–50° C. until the cyclization is complete. The cyclo-octamethylene-imine boils at 70° C. at 20 mm. pressure, and yield a picrate melting at 148–149° C. This imine is identical with the base obtained by reduction of the cyclo-octanone-thioisoxime.

Example 3

The operation is carried out according to the process described in Example 1, with the difference that petroleum ether is used instead of ether.

Example 4

10 grams of the hydrochloride of 1-bromo-15-amino-pentadecane in about 3 litres of butyl alcohol are boiled for several hours with 50 ccm. of ordinary caustic soda solution (2 moles). For working up the mixture can be acidified with hydrochloric acid and the solvent expelled. Isolation of the pure amine is carried out according to the data of Example 1.

Example 5

The operation is conducted according to the data of Example 1, but with the difference that butyl ether is used and that the solution of the initial bromoamine is allowed to boil in this solvent until the conversion is complete. The further procedure is as described in Example 1.

Example 6

10 grams of the hydrochloride of 1-bromo-15-amino-pentadecane are boiled in a great excess of an aqueous solution of sodium benzoate or of another organic hydrotropic compound with addition of 50 ccm. of normal sodium carbonate solution until the conversion is complete. For working up an excess of an aqueous caustic soda solution is added and the base extracted with ether and isolated according to Example 1.

Example 7

10 grams of the hydrochloride of 1-bromo-15-amino-pentadecane in about 3 litres of methyl alcohol or ethyl alcohol are mixed with 50 ccm. of normal caustic potassium solution. The solution of the reaction is maintained at 50° C. for some days. It is then acidified with hydrochloric acid and the solvent expelled. The isolation of the cyclic amine is effected according to the data of Example 1.

Example 8

5 grams of the hydrobromide of 1-bromo-16-amino-hexadecane are dissolved in 1.22 litres of butyl alcohol and mixed with 45 ccm. of normal caustic soda solution. Small quantities of insoluble matter are separated by filtration. The solution is then heated for 12 hours to near the boiling point (oil bath of 120° C.). After duplication of the bromine ion concentration has occurred (ascertained by titration) the solution is acidified with hydrogen bromide and evaporated to dryness in a vacuum. The residue is mixed with alkali, extracted with ether, and the base thus obtained distilled in a high vacuum. Its boiling point lies at about 126° C. (0.2 mm. pressure) and its melting point at about 59° C.

Example 9

15.5 grams of the hydrochloride of 1-chloro-16-amino-hexadecane are dissolved in 50 litres of alcohol of 50 per cent. strength and mixed with 150 ccm. of normal caustic soda solution. After boiling for 24 hours 15.5 grams of the hydrochloride and 120 ccm. of normal caustic soda solution are again added, and boiling continued for another 24 hours. Working up is carried out as indicated in Example 8.

The same reaction can also be performed with the 1-iodo-16-amino-hexadecane.

Example 10

2.6 grams of the hydrobromide of the 1-bromo-6-aminohexane are dissolved in 900 ccm. of water and mixed with 100 ccm. of normal caustic soda solution. The solution is heated at 50° C. during 1 hour and then at 80° C. during ½ hour. The base is thereupon extracted from the solution with ether in an extracting apparatus for 24 hours, the etherified solution dried and cautiously evaporated. The base is directly distilled in a current of nitrogen. Its boiling point lies at 130° C. (723 mm. pressure).

What I claim is:—

1. Process for the production of polymembered cyclic amines comprising heating a compound of the formula $$X-A-NH_2$$

wherein X stands for halogen and A for a normal alkylene chain consisting of at least 6 carbon atoms, in homogeneous solution in an inert organic solvent.

2. Process for the production of polymembered cyclic amines comprising heating a compound of the formula $$X-A-NH_2$$

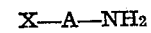

wherein X stands for halogen and A for a normal alkylene chain consisting of at least 6 carbon atoms, in homogeneous solution in an inert organic solvent in presence of an inorganic base.

3. Process for the production of cyclohexadecamethylene-imine comprising heating a compound of the formula $$X-(CH_2)_{16}-NH_2$$

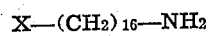

wherein X stands for halogen, in homogeneous solution in an inert organic solvent.

4. Process for the production of cyclohexadecamethylene-imine comprising heating a compound of the formula $$X-(CH_2)_{16}-NH_2$$

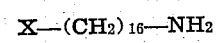

wherein X stands for halogen, in homogeneous solution in an inert organic solvent in presence of an inorganic base.

5. Process for the production of cyclopentadecamethylene-imine comprising heating a compound of the formula $$X-(CH_2)_{15}-NH_2$$

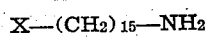

wherein X stands for halogen, in homogeneous solution in an inert organic solvent.

6. Process for the production of cyclopentadecamethylene-imine comprising heating a compound of the formula $$X-(CH_2)_{15}-NH_2$$

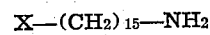

wherein X stands for halogen in homogeneous solution in an inert organic solvent, in presence of an inorganic base.

7. Process for the production of cyclooctamethylene-imine comprising heating a compound of the formula $$X-(CH_2)_8-NH_2$$

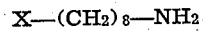

wherein X stands for halogen in homogeneous solution in an inert organic solvent.

8. Process for the production of cyclooctamethylene-imine comprising heating a compound of the formula $$X-(CH_2)_8-NH_2$$

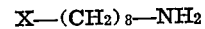

wherein X stands for halogen in homogeneous solution in an inert organic solvent, in presence of an inorganic base.

LEOPOLD RUZICKA.